(12) United States Patent
Rostro et al.

(10) Patent No.: US 8,663,495 B1
(45) Date of Patent: Mar. 4, 2014

(54) GELLED NANOTUBE-CONTAINING HEAT TRANSFER MEDIUM

(75) Inventors: Bertha Catalina Rostro, Houston, TX (US); Enrique V. Barrera, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1877 days.

(21) Appl. No.: 11/677,802

(22) Filed: Feb. 22, 2007

Related U.S. Application Data

(60) Provisional application No. 60/775,567, filed on Feb. 22, 2006.

(51) Int. Cl.
| | |
|---|---|
| *C09K 5/00* | (2006.01) |
| *C10L 7/00* | (2006.01) |
| *B01F 3/12* | (2006.01) |
| *C01B 33/14* | (2006.01) |
| *C01B 33/20* | (2006.01) |
| *C08J 3/02* | (2006.01) |
| *C10M 169/04* | (2006.01) |

(52) U.S. Cl.
USPC .......... 252/74; 44/265; 44/266; 44/268; 44/269; 44/270; 252/75; 516/32; 516/101; 508/113; 508/128

(58) Field of Classification Search
USPC ........ 44/265, 266, 268, 269, 270; 252/74, 75; 516/32, 101; 508/113, 128; 977/734, 977/735, 742, 750, 787
See application file for complete search history.

(56) References Cited

U.S. PATENT DOCUMENTS

| | | | |
|---|---|---|---|
| 4,912,032 A * | 3/1990 | Hoffman et al. | 435/7.1 |
| 5,843,993 A | 12/1998 | Katti et al. | |
| 5,968,650 A | 10/1999 | Tennent et al. | |
| 6,113,819 A | 9/2000 | Tennent et al. | |
| 6,419,717 B2 | 7/2002 | Moy et al. | |
| 6,432,320 B1 | 8/2002 | Bonsignore et al. | |
| 6,491,891 B1 | 12/2002 | Klett et al. | |
| 6,492,014 B1 | 12/2002 | Rolison et al. | |
| 6,495,680 B1 | 12/2002 | Gong | |
| 6,652,967 B2 | 11/2003 | Yadav et al. | |
| 6,695,974 B2 | 2/2004 | Withers et al. | |
| 6,783,746 B1 | 8/2004 | Zhang et al. | |
| 6,824,689 B2 | 11/2004 | Wang et al. | |
| 6,828,282 B2 | 12/2004 | Moy et al. | |
| 6,858,157 B2 | 2/2005 | Davidson et al. | |
| 6,890,654 B2 | 5/2005 | Stupp et al. | |
| 6,891,724 B2 | 5/2005 | De Lorenzo et al. | |
| 6,899,945 B2 | 5/2005 | Smalley et al. | |
| 2004/0120879 A1 * | 6/2004 | Chen et al. | 423/447.1 |
| 2004/0209782 A1 * | 10/2004 | Zhang et al. | 508/113 |
| 2007/0158609 A1 * | 7/2007 | Hong et al. | 252/71 |

OTHER PUBLICATIONS

Xie et al. (Journal of Applied Physics vol. 94 No. 8 pp. 4967-4971).*
Chakrapani et al J Phys Chem B 2003 vol. 107 pp. 9308-9311.*
Ericson et al, "Macroscopic, Neat, Single-Walled Carbon Nanotube Fibers," Science (2004) 305, 1447-1450.
Chen et al, "Soluble Ultra-Short Single-Walled Carbon Nanotubes," J. Am. Chem Soc. (2006) 128, 10568-10571.
Windisch et al, "Time-Resolved Raman Measurements of Hydrocarbon Interactions with Poly-α-olefin Films," J. Phys. Chem. (1996) 100, 19986-19993.
Choi et al, "Effect of Amines on Single-Walled Carbon Nanotubes in Organic Solvents: Control of Bundle Structures," Jpn. J. Appl. Phys. (2002) 41, 6264-6266.
Naota et al, "Molecules that Assemble by Sound: An Application to the Instant Gelation of Stable Organic Fluids," J. Am. Chem. Soc. (2005) 127, 9324-9325.
Kojić-Prodić et al, "Hydrogen Bonding and Molecular Assemblies," Croat. Chem. Acta (2004) 77, 3, 415-425.
Chandler, David, "Interfaces and the driving force of hydrophobic assembly," Nature (2005) 437, 640-647.
Nangia et al, "Supramolecular Structures—Reason and Imagination," Acta Cryst. (1998) A54, 934-944.
Käck et al, "Application of van der Waals Density Functional to an Extended System: Adsorption of Benzene and Napthalene on Graphite," Phys. Rev. Lett. (2006) 96, 14, 146107.
Tritt-Goc, et al, "Gelation Process of Toluene-Based bis-Urea in Cyclohexane Studied with Magnetic Resonance Imaging," Acta Physica Polonica A, (2005) 108, 81-87.
Bachman et al, "The Structural and Functional Equivalence of Aurophilic and Hydrogen Bonding: Evidence for the First Examples of Rotator Phases Induced by Aurophilic Bonding," J. Am. Chem. Soc. (2001) 123, 5376-5377.
Marquis et al, "Improving the Heat Transfer of Nanofluids and Nanolubricants with Carbon Nanotubes," JOM (2005) 57, 12, 32-43.
Xie et al, "Nanofluids containing multiwalled carbon nanotubes and their enhanced thermal conductivities," Journal of Applied Physics (2003) 94, 8, 4967-4971.
Lin-Gibson et al, "Elastic Flow Instability in Nanotube Suspensions," Physical Review Letters (2004) 92, 4, 048302-1-048302-4.
Gao et al, "Self-assembly of modified carbon nanotubes in toluene," Chemical Physics Letters (2003) 661-663.
Cianci et al, "Colloidal Gels and Depletion," research on www.physics.emory.edu/~weeks/lab/gelpage/ (2007).
Lu, Peter, "Investigating the Structure and Dynamics of Colloidal Depletion Gels with confocal microscopy, light scattering and rheology," research on www.seas.harvard.edu/projects/weitzlab/research/gels_plu.html (2005).
Prasad, Vikram, "Weakly Aggregating Colloidal Systems," www.seas.harvard.edu/projects/weitzlab/research/gels.html (2007).
Masuda et al., Alteration of Thermal Conductivity and Viscosity of Liquid by Dispersing Ultra-Fine Particles (Dispersion of Al2O3, SiO2 and TiO2 Ultra-Fine Particles), Netsu Bussei, 4, 227 1993.
Lee et al, Measuring Thermal Conductivity of Fluids Containing Oxide Nanoparticles, J. Heat Trans., 121, 280 1999.

(Continued)

*Primary Examiner* — Patrick Ryan
*Assistant Examiner* — Aaron Greso
(74) *Attorney, Agent, or Firm* — Winstead PC

(57) ABSTRACT

According to some embodiments, the present provides a heat transfer medium that includes, but is not limited to a base fluid, a plurality of single-walled carbon nanotubes, and a gelling formulation formed of an amine surfactant, an intercalating agent, and an oxygen-bearing solvent. The heat transfer medium is adapted for improved thermal conductivity with respect to the base fluid.

16 Claims, No Drawings

(56) References Cited

OTHER PUBLICATIONS

Eastman et al., Anomalously increased effective thermal conductivities of ethylene glycol-based nanofluids containing copper nanoparticles, Appl. Phys. Lett., 78, 718, 2001.
Wang et al, Thermal Conductivity of Nanoparticle-Fluid Mixture, J. Thermophys. Heat Trans., 13, 474, 1999.
Choi et al., Anomalous thermal conductivity enhancement in nanotube suspensions, Appl. Phys. Lett., 79, 2252, 2001.
Eastman et al., Novel thermal properties of nanostructured materials, Mat. Sci. Forum, 312-314,629-634 1999.
Xuan et al., Heat transfer enhancement of nanofluids, Int. J. Heat Fluid Flow, 21, 58-64, 2000.
Xuan et al., Conceptions for heat transfer correlation of nanofluids, J. Heat Mass Trans., 43, 3701-3707, 2000.
Keblinski et al., Mechanisms of heat flow in suspensions of nano-sized particles (nanofluids), Int. J. Heat Mass Trans. 45, 855-863, 2002.
Jang et al., Role of Brownian motion in the enhanced thermal conductivity of nanofluids, Appl. Phys. Lett., 84, 4316, 2004.
Bhattacharya et al., Brownian dynamics simulation to determine the effective thermal conductivity of nanofluids, J. Appl. Phys., 95, 6492, 2004.
Luo et al., Thermophysical properties of carbon/carbon composites and physical mechanism of thermal expansion and thermal conductivity, Carbon, 42, 2887-2895, 2004.
Dresselhaus et al., Unusual Properties and Structure of Carbon Nanotubes, Annu. Rev. Mater. Res., 34, 247-278, 2004.
Livi et al., Heat in one dimension, Nature, 421, 327, 2003.
Narayan et al., Anomalous Heat Conduction in One-Dimensional Momentum-Conserving Systems, Phys. Rev. Lett. 89, 200601-1, 2002.
Fukai et al., Thermal conductivity enhancement of energy storage media using carbon fibers, En. Con. Man., 41, 1543-1556, 2000.
Ruoff et al., Mechanical and Thermal Properties of Carbon Nanotubes, Carbon, 33, 925-930, 1995.
Cao et al, Recovered bandgap absorption of single-walled carbon nanotubes in acetone and alcohols, Adv. Mater., 17, 147, 2005.
Spikes, The history and mechanisms of ZDDP, Tribology Lett., 17, 469, 2004.
Chakrapani et al., Chemisorption of Acetone on Carbon Nanotubes, J. Phys. Chem. B., 107, 9308-9311, 2003.
Tomlinson et al., Adsorption properties of succinimide dispersants on carbonaceous substrates, Carbon, 38, 13-28, 2000.
Yabuuchi et al., A new area gelator: incorporation of intra- and intermolecular hydrogen bonding for stable 1D self-assembly, Org. Biomol. Chem., 1, 3464, 2003.
Sun et al., Development of a dispersion process for carbon nanotubes in ceramic matrix by heterocoagulation, Carbon, 41, 1063-1068, 2003.
Vujakovic et al., Adsorption of inorganic anionic contaminants on surfactant modified minerals, J. Serb. Chem. Soc., 68, 833-841, 2003.
Wang et al., Low molecular weight organogelators for water, Chem. Comm., 310, 2003.
Lu et al., Use of Ionic Liquids for _-Conjugated Polymer Electrochemical Devices, Science 297, 983, 2002.
Kamogawa et al., Surfactant-free O/W emulsion formation of oleic acid and its esters with ultrasonic dispersion, Col. Surf. A: Physicochem. Eng. Aspects, 180, 41-53, 2001.
Lyon et al., Self-Assembly and Gelation of Oxidized Glutathione in Organic Solvents, J. Am. Chem. Soc., 123, 4408-4413, 2001.
Kharchenko et al., Flow-induced properties of nanotube-filled polymer materials, Nat. Mater., 3, 564, 2004.
Shaffer et al., Analogies between Polymer Solutions and Carbon Nanotube Dispersions, Macromolecules, 32, 6864-6866, 1999.
Mas et al., Rheology of colloidal suspensions: Case of lubricating greases, J. Rheol., 38, 889, 1994.
Maleque et al., Vegetable-based biodegradable lubricating oil additives, Indus. Lub. Tribology, 55, 137, 2003.
Carcel et al., Evaluation of vegetable oils as pre-lube oils for stamping, Materials & Design, 26, 587-593, 2005.
Sharma et al., Soybean Oil Based Greases: Influence of Composition on Thermo-oxidative and Tribochemical Behavior, J. Agr. Food Chem., 53, 2961-2968, 2005.
Rhee, Biodegradable grease technology for future army combat systems, 24th Army Science Conference Proceedings O: Environmental & Engineering Geosciences, Poster Session, OP-08, 2004.
Groza et al., Infrared spectral investigation of the linseed oil polymerization in a corona discharge in air at atmospheric pressure, Europhys. Lett., 68, 652-657, 2004.
Adhvaryu et al., Preparation of Soybean Oil-Based Greases: Effect of Composition and Structure on Physical Properties, J. Agric. Food Chem., 52, 6456-6459, 2004.
Panhuis et al., A Composite From Soy Oil and Carbon Nanotubes, Int. J. Nanoscience, 2, 185-194, 2003.
Wagner et al., Lubricant base fluids based on renewable raw materials their catalytic manufacture and modification, Appl. Cat. A: Gen., 221, 429-442, 2001.
Zeman et al., Biodegradable lubricants-studies on thermo-oxidation of metal-working and hydraulic fluids by differential scanning calorimetry (DSC), Thermochimica Acta, 268, 9-15, 1995.
Bhattacharyya et al., Vegetable oils as fuels for internal combustion engines: a review, J. Agric. Engng Res., 57, 157-166, 1994.
Wilson, Lubricants and functional fluids from renewable sources, Ind. Lub. Tribology, 50, 6, 1998.
Dicken, Biodegradable greases, Ind. Lub. Tribology 46, 3-6, 1994.
Willing, Lubricants based on renewable resources—an environmentally compatible alternative to mineral oil products, Chemosphere, 43, 89-98, 2001.
Liston, Engine lubricant additives what they are and how they function, Lubrication Engineering, 389, May 1992.
Chevalier et al., Review: The adsorption of functional polymers from their organic solutions: applications to fuel additives, Polym. Int., 53, 475-483, 2004.
Galsworthy et al., Oil-soluble colloidal additives, Curr. Opin. Coll. Inter. Sci., 5, 274-279, 2000.
Willennet, Some engine oil additives and their effects on antiwear film formation, Tribol. Lett., 5, 41-47, 1998.
Jain et al., Evaluation of thermo-oxidative characteristics of gear oils by different techniques: Effect of antioxidant chemistry, Thermochimica Acta, 435, 172-175, 2005.
Adhvaryu et al., Studies on the oxidative behavior of base oils and their chromatographic fractions, Fuel, 78, 1293-1302, 1999.
Canning et al, Spectromicroscopy of tribological films from engine oil additives. Part I. Films from ZDDP's, Tribol. Lett., 6, 159-169, 1999.
Evstafev et al., A new dithiophosphate additive for lubricating oils, Chem. Tech. Fuels Oils, 37, 427, 2001.
Mosey et al., Molecular Mechanisms for the Functionality of Lubricant Additives, Science, 307, 1612, 2005.
Sheasby et al., The effect of sample spin on boundary lubricaton by several oil blends based upon zinc dialkyldithiophosphates, Wear, 231, 256-264, 1999.
Yin et al., Application of soft X-ray absorption spectroscopy in chemical characterization of antiwear films generated by ZDDP part II: the effect of detergents and dispersants, Wear, 202, 192-201, 1997.
Burn et al., The Mechanism of the Antioxidant Action of Zinc Dialkyl Dithiophosphates, Tetrahedron, 22, 2153-2161, 1966.
Shea et al., Solution phase reactions of organomolybdenum friction modifier addtives for energy conserving engine oils, Tribol. Lett., 12, 13, 2002.
Sarin et al., olybdenum dialkylphosphorodithioates: synthesis and performance evaluation as multifunctional additives for lubricants, Tribol. Int., 27, 379, 1994.
Bezot et al., Aggregation Kinetics of Colloidal Suspensions of Engine Soots. Influence of Polymeric Lubricant Additives, Carbon, 35, 53-60, 1997.
Fox et al., Inverse micelles and solubilization of proton donors in hydrocarbon formulations, Tribol. Int., 24, 341, 1991.
Baladincz et al., Interactions of additives in lubricating oil compositions, Hung. J. Ind. Chem. Veszprem, 26, 155-159, 1998.

(56) References Cited

OTHER PUBLICATIONS

Eastman et al., Thermal Transport in Nanofluids, Annu. Rev. Mater. Res., 34, 219-246, 2004.
Berber Unusually High Thermal Conductivity of Carbon Nanotubes, Phys. Rev. Lett., 84, 4613, 2000.
Assael et al., Thermal Conductivity of Suspensions of Carbon Nanotubes in Water, Int. J. Thermophysics, 25, 971, 2004.
Lozano et al., Rheological examination of C60 in low density solutions, Carbon, 40, 271-276, 2002.
Vadasz et al., Heat Transfer Enhancement in Nanofluid Suspensions, Possible mechanisms and explanations, Int. J. Heat Mass Trans., 48, 2673-2683, 2005.
Xue, Model for effective thermal conductivity of nanofluids, Phys. Lett. A, 307, 313-317, 2003.
Yu et al., The role of interfacial layers in the enhanced thermal conductivity of nanofluids: a renovated Maxwell model, J. Nanoparticle Res., 5, 167-171, 2003.
Keblinski et al., Nanofluids for thermal transport, Materials Today 8, 36, 2005.
Phillpot et al., Introduction to thermal transport, Materials Today, 8, 18, 2005.
Reich et al., Carbon Nanotubes: Basic Concepts and Physical Properties, Wiley-VCH, 2004.
Hone et al., Thermal properties of carbon nanotubes and nanotube-based materials, Appl. Phys. A Mat. Sci., 74, 339-343, 2002.
Hone Phonons and Thermal Properties of Carbon Nanotubes, Carbon Nanotubes, Topics Appl. Phys., 80, 273-286, 2001.
Dresselhaus et al., Raman spectroscopy of carbon nanotubes, Phys. Rep., 409, 47-99, 2005.
Huxtable et al., Interfacial heat flow in carbon nanotube suspensions, Nat. Mat., 2, 731, 2003.
Romero et al., Atom Collision-Induced Resistivity of Carbon Nanotubes, Science, 307, 89, 2005.
Padgett et al., Influence of Chemisorption on the Thermal Conductivity of Single-Wall Carbon Nanotubes, NanoLetters, 4, 1051-1053, 2004.
Fukushima et al., Molecular Ordering of Organic Molten Salts Triggered by Single-Walled Carbon Nanotubes, Science, 300, 2072, 2003.
De Loos et al., Tripodal Tris-Urea Derivatives as Gelators for Organic Solvents, Eur. J. Org. Chem., 22, 3675-3678, 2000.
Juyal et al., Urea, thiourea and guanidine derivatives as multifunctional fuel stabilizers, Fuel, 82, 97-103, 2003.
Bimer et al., Modified active carbons from precursors enriched with nitrogen functions: sulfur removal capabilities, Fuel, 77, 519-525, 1998.
Pignon, Diesel Engines: Design and Emissions Review of a Course on Diesel Particulates and NOX Emissions, Platinum Metals Rev., 49, 119, 2005.
Hannigan et al., A pulsed photoacoustic system for the spectroscopy and monitoring of hydrocarbon liquids using stimulated Raman scattering in a silica fibre as a near-infrared source, Meas. Sci. Technol., 10, 93-99, 1999.
Chmielarz et al., Studies on the double bond positional isomerization process in linseed oil by UV, IR and Raman spectroscopy, J. Molec. Struct., 348, 313-316, 1995.
Santos et al., Thermoanalytical and rheological characterization of automotive mineral lubricants after thermal degradation, Fuel, 83, 2393-2399, 2004.
Vettegren et al., IR-spectroscopic study of the deformation of alkane molecules on a metal surface at high temperature, Tech. Phys. Lett, 23, 82-86, 1997.
Gamlin et al., Evaluation of kinetic parameters of thermal and oxidative decomposition of base oils by conventional, isothermal and modulated TGA, and pressure DSC, Thermochimica Acta, 392-393, 357-369, 2002.
Chiang et al., Purification and Characterization of Single-Wall Carbon Nanotubes, J. Phys. Chem. B, 105, 1157-1161, 2001.
Bernhardt, Particle Size Analysis Classification and Sedimentation Methods, Chapman & Hall (1994).
Nagai et al., Thermal conductivity measurement of liquid materials by a hot-disk method in short-duration microgravity environments, Mat. Scie. & Eng. A, 276, 117-123, 2000.
Kinloch et al., A rheological study of concentrated aqueous nanotube dispersions, Polymer, 43, 7483-7491, 2002.
Gong et al., Fabrication and structure: a study of aligned carbon nanotube/carbon nanocomposites, Solid State Comm., 131, 399-404, 2004.
Suhr et al., Viscoelasticity in carbon nanotube composites, Nature Mat., 4, I34, 2005.

\* cited by examiner

GELLED NANOTUBE-CONTAINING HEAT TRANSFER MEDIUM

CROSS-REFERENCE TO RELATED APPLICATION

This application claims priority to and benefit of U.S. Provisional Application Ser. No. 60/775,567, filed on Feb. 22, 2006, entitled: "Formulation, Processing, and Gelation of Carbon-based Nanoparticles in Heat Transfer Media for Enhanced Thermal Conductivity Use", hereby incorporated herein by reference.

STATEMENT OF GOVERNMENT SPONSORSHIP

The present invention was made in part with government support under AGEP Grant No. HRD-9817585 awarded by the National Science Foundation and URETI Cooperative Agreement No. NCC-1-02038 awarded by the National Aeronautics and Space Administration. The Government has certain rights in this invention.

FIELD OF THE INVENTION

The present invention relates in general to heat transfer media, more particularly to heat transfer media containing gelled single-walled carbon nanotubes.

BACKGROUND OF THE INVENTION

Lubricants and cooling agents such as oil, ethylene glycol, and water are often used as traditional heat transfer fluids in engines, radiators, heat pumps, and other equipment which require cooling and/or energy maintenance. The United States of America spends over $80 billion on energy maintenance. An increase in thermal efficiency of heat transfer fluids has the potential to reduce the cost of energy maintenance. Thus, there is continuing interest and need for increasing the thermal efficiency of heat transfer fluids.

BRIEF DESCRIPTION OF THE INVENTION

According to some embodiments, the present provides a heat transfer medium that includes, but is not limited to a base fluid, a plurality of single-walled carbon nanotubes, and a gelling formulation formed of an amine surfactant, an intercalating agent, and an oxygen-bearing solvent. The heat transfer medium is adapted for improved thermal conductivity with respect to the base fluid.

DETAILED DESCRIPTION OF THE INVENTION

According to some embodiments, the present provides a heat transfer medium that includes, but is not limited to a base fluid, a plurality of single-walled carbon nanotubes, and a gelling formulation formed of an amine surfactant, an intercalating agent, and an oxygen-bearing solvent. The heat transfer medium is adapted for improved thermal conductivity with respect to the base fluid.

The composition may be as follows: from about 0.1 wt % to about 40 wt % single-walled carbon nanotubes (SWNTs); from about 0.35 wt % to about 22 wt % gelling formulation; and from about 38 wt % to about 99 wt % base fluid. For example, the composition may be as follows: from about 0.1 wt % to about 40 wt % single-walled carbon nanotubes; from about 0.25 wt % to about 20 wt % amine surfactant; from about 0.1 wt % to about 1 wt % intercalating agent; from about 0.1 to about 1 wt % oxygen-bearing solvent, and from about 38 wt % to about 99 wt % base fluid.

The heat transfer medium may further contain additives for alternative functions besides thermal conductivity. When the heat transfer medium contains additives, the composition may be as follows: from about 0.1 wt % to about 40 wt % single-walled carbon nanotubes (SWNTs); from about 0.35 wt % to about 22 wt % gelling formulation; from about 0.1 wt % to about 10 wt % additives; and from about 28 wt % to about 98 wt % base fluid. For example, when the heat transfer medium contains additives, the composition may be as follows: from about 0.1 wt % to about 40 wt % single-walled carbon nanotube (SWNT); from about 0.25 wt % to about 20 wt % amine surfactant; from about 0.1 wt % to about 1 wt % intercalating agent; from about 0.1 to about 1 wt % oxygen-bearing solvent, from about 0.25 wt % to about 10 wt % additives; and from about 28 wt % to about 98 wt % base fluid.

The single-walled carbon nanotubes may be purified or unpurified. Alternatively, or combination, they may be functionalized or unfunctionalized. Functionalized nanotubes may be functionalized with any one or combination of fluorine, carboxyl groups, and other suitable known functionalizing groups.

The nanotubes may be arranged in a micronetwork such that the heat transfer medium is a gel.

The heat transfer medium may contain greater than about 1 wt % nanotubes.

The base fluid base fluid may be selected so as to be chemically compatible with an engine-related fluid. The engine-related fluid may be selected from among coolants, lubricants, and fuels. The base fluid may include at least in part an oil. The oil may be selected from among bio-based oils, petroleum oils, synthetic oils, and combinations thereof.

The amine surfactant may be selected from among alkyl amines and aryl amines. An alkyl or aryl group in the surfactant may be substituted, such as borated or functionalized. The amine surfactant may be, for example, oleylamine.

The intercalating agent may be selected from among weak van der Waals solvents, aromatic solvents, and combinations thereof. The intercalating agent may be, for example, toluene. Another suitable intercalating agent is benzene.

The oxygen-bearing solvent may be selected from among aldehydes, ketones, alcohols, and combinations thereof. The oxygen-bearing solvent may be, for example, acetone.

The thermal conductivity of the heat transfer medium may be at least 10% greater than that of the base fluid. For example, the thermal conductivity of the heat transfer medium may be from about 10% to about 100% greater than the thermal conductivity of the base fluid.

It will be understood that the above-described embodiments may be practiced singled or in combination with other of the above-described embodiments.

A method of making the heat transfer medium may include combining the nanotubes, the amine surfactant, and the base fluid so as to form a first composition; and mixing the first composition for from about 1 second to about 48 hours, more typically from about 1 hr to about 24 hr. For example, the mixing may proceed overnight.

The method may further include combining the mixed first composition with the intercalating agent and the oxygen-bearing solvent so as to form a second composition; and mixing the second composition for from about 1 second to about 48 hours, more typically from about 1 hr to about 24 hr.

For example, the mixing may proceed overnight. Some of each of the intercalating agent and oxygen-bearing solvent may evaporate by air. However, some of each may be maintained trapped onto nanotubes. Each may be trapped by physisorption and/or chemisorption.

The method may further include processing the mixed second composition. Processing may include a procedure to make the second mixed composition uniform throughout, leading for example to a particle size distribution of 0.5-2 microns. Homogenizing the mixture is an exemplary process to make the mixture uniform. Processing may further include a procedure to deglomerate the mixture. Ultrasonication is a exemplary process for deglomerating the mixture. The sonicator horn may be from ⅓ to ½ of the size of the vessel (by volume) containing the mixture. Further the horn may be totally immersed in the vessel. While not wishing the be limited by this interpretation, the present inventors believe that it is the synergism of the interaction of the amine surfactant, the intercalation agent, and the oxygen-bearing solvent on the nanotubes, together with the ultrasonication that allows the nanotubes to form a network such that the heat transfer medium is a gel.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE

This example illustrates a method for making a heat transfer medium containing single-walled carbon nanotubes (SWNTs) in which the base fluid is an oil and the gelling formulation is oleylamine, toluene and acetone.

For this work a typical dispersion route entailed a process that involved soaking the carbon nanotubes in the oils and detergents for 24 hours to promote physisorption of these molecules followed by solvent processing for 24 hours with toluene-acetone and homogenization for 2.5 hours and ultrasonication for 15 minutes.

The single-walled carbon nanotube (SWNT) material was obtained from Carbon Nanotechnologies Incorporated and contained about 6-20% of metal contents. Purified SWNT material likewise was obtained from Carbon Nanotechnologies Incorporated and contained up to about 4% of metal contents. Note that the SWNTs generally exist as bundles of 20-100 individual fibers that are 0.7-1.9 nm in diameter around 1 μm long. The bundles are randomly distributed in a plane structure that is kept together via nodes of weak Van der Waals. The large length-to-diameter ratio of the SWNTs results in strong anisotropy that becomes relevant for thermal conductivity.

BP166 poly-α-olefin oil was purchased from British Petroleum (BP) and used as received. 100 ml of the oil was formulated with 1 wt % loading of oleylamine and 1 wt % loadings of each of the following additives: Chevron Oronite OLOA 269R-ZDDP, Chevron Oronite OLOA 11002-Ashless Succinimide.

The n-HTF fluids were prepared by measuring the respective weight % fractions of SWNT on an analytical balance and allowed to swell in oil-additives-oleylamine for 24 hours via stirring (setting 5) on a hot-plate stirrer. The SWNT-oil-additive-oleylamine mixture was then combined with 150 mL toluene and 10 mL of acetone and allowed to stir (setting 5) for 24 hours on a hot-plate-stirrer.

The samples were homogenized by continual homogenization for 2.5 hours, in 25 mL conical vials, using a Fisher Tissuemiser homogenizer (setting 5).

The samples were ultrasonicated for 15 minutes. Extensive sonication studies were conducted using a number of different sonication horns and containers of varying dimensions. The sonication power depends upon the dimensions of the vessel, intensity, and length of. The cavitation energy is desirably large enough to counteract the contractibility stresses that are leading to the SWNT aggregates. An exemplary sonication route involved the use of a 13-mm (½") diameter probe (Cole-Parmer 750-Watt Ultrasonic Homogenizer), at a frequency of 15 kHz. The probe was immersed directly into 25 milliliter (mL) vials that contained 20 mL of n-HTFs. Here the dispersing effect of the ultrasound was intensified with increased contact area of the sonication horn with the material.

The product nanotube heat transfer fluids (n-HTFs) showed a gel-like appearance to the naked eye. Further, optical microscopy revealed a fine micronetwork structure.

It was noted that without oleylamine, 1 wt % of SWNTs was the maximum achievable loading, while its inclusion allowed for a 10 wt % SWNT loading. It was noted that the ZDDP works mainly as a wear inhibitor while the ashless succinimide helps to control oxidation, however neither helped to increase dispersion or to deter particle-particle aggregation.

It is believed by the presence inventors that neither ashless succinimide nor ZDDP contributes to gellation. However, it is noted that gellation occurred in the presence of these oil additives which are common in some engine applications.

Raman spectra were consistent with the formation of a gel. The vibrational nature of molecules in the product was examined using Raman spectroscopy. A peak at 1606.50 $cm^{-1}$ indicative of a C—N aromatic stretch was observed in the product, while it was absent in comparative samples of the oils and the SWNTs. It is believed by the present inventors that this peak reflects SWNT-oleylamine bonding.

The formation of a gel is further support by the thermal conductivity data. The present inventors believe that the thermal conductivity data reflects the connectivity of the nanotubes to form a micronetwork that facilitates thermal transport.

A KD sensor was used for the thermal conductivity (TC) measurements. The KD2 is a handheld meter that uses a single-needle sensor. The KD2 technique is a handheld meter that uses a single-needle sensor (60 mm length, 1.28 mm diameter, 72 cm cable length, range of TC data is from 0.02 to 2 Watts/meter Celsius, W/mC) to measure the TC and thermal resistivity. Here a precise heating and monitoring system measures the slope and intercept of the sample via the specific temperature rise versus time curve. The system then monitors the dissipation of heat from the line heat source leads to data that has less than a 5% TC error. The KD2 was standardized with base oils and compared to NIST TC values. It was noted that the values agreed exactly with the NIST TC standards. For the n-HTFs three measurements were made and averaged. Convection issues were minimized by allowing the samples to equilibrate for 10 minutes.

The thermal conductivity data obtained using BP166 as the base fluid is listed in the following table.

| Nanotube type | Nanotube loading | TC (W/mK) | TC increase |
| --- | --- | --- | --- |
| (comparative) | 0 wt % | 0.1448 | 0% |
| SWNT | 1 wt % | 0.1645 | 14% |
| SWNT | 2.5 wt % | 0.1834 | 27% |
| SWNT | 5 wt % | 0.2162 | 49% |
| Purified SWNT | 1 wt % | 0.1620 | 12% |
| Purified SWNT | 2.5 wt % | 0.2038 | 41% |
| Purified SWNT | 5 wt % | 0.2177 | 50% |
| Purified SWNT | 10 wt % | 0.2841 | 96% |

These thermal conductivity data demonstrate the improvement in thermal conductivity for these exemplary heat transfer media. The data illustrate a thermal conductivity of the heat transfer medium at least 10% greater than that of the base fluid. Further, the date illustrate a thermal conductivity of the heat transfer medium from about 10% to about 100% greater than the thermal conductivity of the base fluid.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A heat transfer medium, comprising:
    a base fluid;
    a plurality of single-walled carbon nanotubes; and
    a gelling formulation that causes the heat transfer medium to form a gel, the gelling formulation comprising:
        oleylamine;
        a succinimide;
        an intercalating agent; and
        an oxygen-bearing solvent, wherein the single-walled carbon nanotubes are arranged in a network in the gel, and wherein the network comprises SWNT-oleylamine bonds.

2. The heat transfer medium according to claim 1, wherein the base fluid is selected so as to be chemically compatible with an engine-related fluid.

3. The heat transfer medium according to claim 2, wherein the engine-related fluid is selected from the group consisting essentially of coolants, lubricants, and fuels.

4. The heat transfer medium according to claim 1, wherein the base fluid comprises an oil.

5. The heat transfer medium according to claim 4, wherein the oil is selected from the group consisting essentially of bio-based oils, petroleum oils, synthetic oils, and combinations thereof.

6. The heat transfer medium according to claim 1, wherein the concentration of the single-walled carbon nanotubes is greater than about 1 wt. %.

7. The heat transfer medium according to claim 1, wherein the intercalating agent is selected from the group consisting essentially of weak van der Waals solvents, aromatic solvents, and combinations thereof.

8. The heat transfer medium according to claim 7, wherein the intercalating agent comprises toluene.

9. The heat transfer medium according to claim 1, wherein the oxygen-bearing solvent is selected from the group consisting essentially of aldehydes, ketones, alcohols, and combinations thereof.

10. The heat transfer medium according to claim 9, wherein the oxygen-bearing solvent comprises acetone.

11. The heat transfer medium according to claim 1, wherein the thermal conductivity of the heat transfer medium is at least 10% greater than that of the base fluid.

12. A heat transfer medium, comprising:
    a base fluid;
    a plurality of single-walled carbon nanotubes; and
    a gelling formulation that causes the heat transfer medium to form a gel, the gelling formulation comprising:
        oleylamine;
        a succinimide;
        toluene; and
        acetone, wherein the single-walled carbon nanotubes are arranged in a network in the gel, and wherein the network comprises SWNT-oleylamine bonds.

13. The heat transfer medium according to claim 12, wherein the base fluid is selected so as to be chemically compatible with an engine-related fluid.

14. The heat transfer medium according to claim 13, wherein the engine-related fluid is selected from the group consisting essentially of coolants, lubricants, and fuels.

15. The heat transfer medium according to claim 12, wherein the base fluid comprises an oil.

16. A heat transfer medium, comprising:
    an oil;
    a plurality of single-walled carbon nanotubes; and
    a gelling formulation that causes the heat transfer medium to form a gel, the gelling formulation comprising:
        oleylamine;
        a succinimide;
        toluene; and
        acetone, wherein the single-walled carbon nanotubes are arranged in a network in the gel, and wherein the network comprises SWNT-oleylamine bonds.

* * * * *